(12) United States Patent
Li et al.

(10) Patent No.: US 12,304,059 B2
(45) Date of Patent: May 20, 2025

(54) GRASPING DEVICE, ROBOT GRASPING JAW AND ROBOT

(71) Applicants: SHANGHAI FLEXIV ROBOTICS TECHNOLOGY CO., LTD., Shanghai (CN); FLEXIV LTD., Cayman Islands (GB)

(72) Inventors: Wenbin Li, Santa Clara, CA (US); Hao Jiang, Santa Clara, CA (US)

(73) Assignees: SHANGHAI FLEXIV ROBOTICS TECHNOLOGY CO., LTD., Shanghai (CN); FLEXIV LTD., Grand Cayman (KY)

( * ) Notice: Subject to any disclaimer, the term of this patent is extended or adjusted under 35 U.S.C. 154(b) by 0 days.

(21) Appl. No.: 17/997,201

(22) PCT Filed: Nov. 16, 2021

(86) PCT No.: PCT/CN2021/130834
§ 371 (c)(1),
(2) Date: Oct. 26, 2022

(87) PCT Pub. No.: WO2023/087130
PCT Pub. Date: May 25, 2023

(65) Prior Publication Data
US 2024/0238988 A1 Jul. 18, 2024

(51) Int. Cl.
*B25J 15/00* (2006.01)
*B25J 13/08* (2006.01)

(52) U.S. Cl.
CPC ........... *B25J 15/008* (2013.01); *B25J 13/085* (2013.01)

(58) Field of Classification Search
CPC .............................. B25J 15/008; B25J 13/085
See application file for complete search history.

(56) References Cited

U.S. PATENT DOCUMENTS

| 10,647,004 B2 * | 5/2020 | Hawkes ............... B25J 15/0085 |
| 2019/0061169 A1 | 2/2019 | Jiang et al. |

(Continued)

FOREIGN PATENT DOCUMENTS

| CN | 1378901 A | 11/2002 |
| CN | 101959436 A | 1/2011 |

(Continued)

OTHER PUBLICATIONS

International Search Report dated Aug. 16, 2022 issued in counterpart Parent Application No. PCT/CN2021/130834 (5 pages).

(Continued)

*Primary Examiner* — Dalena Tran
(74) *Attorney, Agent, or Firm* — GREENBLUM & BERNSTEIN, P.L.C.

(57) ABSTRACT

The present disclosure discloses a grasping device, a robot grasping jaw and a robot. The grasping device includes: a bracket; a gecko biomimetic adhesive pad having a first surface with a directional dry adhesion structure; a first connecting structure connecting the bracket and a first side of the gecko biomimetic adhesive pad; and a second connecting structure provided opposite to the first connecting structure and connecting the bracket and a second side of the gecko biomimetic adhesive pad. The first connecting structure is retractable. The first connecting structure and the second connecting structure are configured to collaboratively provide a loading force in a first direction to the gecko biomimetic adhesive pad.

16 Claims, 11 Drawing Sheets

(56) References Cited

U.S. PATENT DOCUMENTS

| | | | |
|---|---|---|---|
| 2019/0143532 A1 | 5/2019 | Cutkosky et al. | |
| 2019/0176342 A1 | 6/2019 | Hawkes et al. | |
| 2019/0231356 A1* | 8/2019 | Deville | A61B 17/1285 |
| 2020/0338750 A1 | 10/2020 | Alizadehyazdi et al. | |
| 2020/0398438 A1 | 12/2020 | Jiang et al. | |
| 2022/0063038 A1* | 3/2022 | Monsarrat | B64C 25/68 |
| 2023/0087850 A1* | 3/2023 | Asada | B60B 19/006 180/55 |

FOREIGN PATENT DOCUMENTS

| | | | |
|---|---|---|---|
| CN | 102099731 A | 6/2011 | |
| CN | 102215720 A | 10/2011 | |
| CN | 103979030 A | 8/2014 | |
| CN | 203889500 U | 10/2014 | |
| CN | 110524563 A | 12/2019 | |
| CN | 110723229 A | 1/2020 | |
| CN | 110730707 A | 1/2020 | |
| CN | 110769988 A | 2/2020 | |
| CN | 111168701 A | 5/2020 | |
| CN | 113635316 A | 11/2021 | |
| EP | 2 495 213 A1 | 9/2012 | |
| EP | 3 851 916 A1 | 7/2021 | |
| JP | 2020-066084 A | 4/2020 | |
| WO | 2018/189099 A1 | 10/2018 | |
| WO | 2018/202729 A1 | 11/2018 | |

OTHER PUBLICATIONS

Written Opinion dated dated Aug. 16, 2022 issued in counterpart Parent Application No. PCT/CN2021/130834 (4 pages).
Chinese Office Action dated Oct. 18, 2022 issued in counterpart Patent Application No. 202111353343.2 (9 pages).
Li et al., "Load Sharing Design of a Multi-legged Adaptable Gripper With Gecko-Inspired Controllable Adhesion", IEEE Robotics and Automation Letters, vol. 6, No. 4, Oct. 2021, pp. 8482-8489.
Liuwei, "Design of Bionic Flexible Auto Attaching-Detaching Accessory and Adhesion Mechanism", A Thesis in Mechanical Engineering, Nanjing University of Aeronautics and Astronautics, The Graduate School, College of Mechanical & Electrical Engineering, Apr. 2020, w/English Abstract, (88 pages).
Hirano et al., "Underactuated Gecko Adhesive Gripper for Simple and Versatile Grasp", 2020 IEEE International conference on Robotics and Automation (ICRA), May 31-Aug. 31, 2020, Parts, France, 8964-8969.
Jiang et al., "Scaling Controllable Adhesives to Grapple Floating Objects in Space", 2015 IEEE International conference on Robotics and Automation (ICRA), May 26, 2015, 2828-2835.
Extended European Search Report issued in European Patent Appl No. 21964297.2 dated Nov. 21, 2024.

* cited by examiner

GRASPING DEVICE, ROBOT GRASPING JAW AND ROBOT

CROSS-REFERENCE OF RELATED APPLICATIONS

This application is a National Phase of International Application No. PCT/CN2021/130834, filed Nov. 16, 2021, entitled "GRASPING DEVICE, ROBOT GRASPING JAW AND ROBOT", the contents of which are expressly incorporated by reference herein in its entirety.

TECHNICAL FIELD

The present disclosure relates generally to grasping mechanism, and more particularly, to a grasping device, a robot grasping jaw and a robot.

BACKGROUND

Gecko biomimetic adhesive is a gecko-inspired dry adhesion surface, which provides adhesion through intermolecular interaction. Conventional gecko biomimetic adhesive mechanisms use flexible tendons to load the adhesives. Flexible tendons are routed and tied to pre-drilled holes on an edge of rigid gecko biomimetic adhesive pads, which are difficult to manufacture and scale up, and lack of freedom for adjustment.

In some prior cases, rope tendons are only attached to the gecko biomimetic adhesive pads along the preferred shear direction (X-axis), which optimizes a load in a preferred-shear-normal plane (X-Z plane) but limits the loading capability in a lateral shear direction (Y-direction). For example, the resulting preferred shear (X) capability of such systems is usually 2-3 times larger than the share capability in the lateral shear (Y) direction, resulting in unbalanced loading capabilities in different directions. Moreover, the rope tendon elongates under loading (stretch) due to its elasticity, and thus fails to lock the mechanism.

A latest mechanism is proposed which adds flexible tendons to the lateral shear (Y) direction to make up the loading capability in Y direction, and is expected to achieve a more balanced loading capabilities in both X and Y directions. Polymer film tendons is used to replace the rope tendons. The polymer film slightly reduces the tendon's elasticity over the rope tendon and thus has less elongation under stretching.

However, due to its rigidity, the polymer film tendon has buckling effect under compression, which will introduce unwanted twisting of the gecko biomimetic adhesive pads.

SUMMARY

One aspect of the present disclosure provides a grasping device, including: a bracket; a gecko biomimetic adhesive pad having a first surface with a directional dry adhesion structure; a first connecting structure connecting the bracket and a first side of the gecko biomimetic adhesive pad; and a second connecting structure provided opposite to the first connecting structure and connecting the bracket and a second side of the gecko biomimetic adhesive pad. The first connecting structure is retractable. The first connecting structure and the second connecting structure are configured to collaboratively provide a loading force in a first direction to the gecko biomimetic adhesive pad.

Another aspect of the present disclosure provides a robot grasping jaw including a grasping device, which including: a bracket; a gecko biomimetic adhesive pad having a first surface with a directional dry adhesion structure; a first connecting structure connecting the bracket and a first side of the gecko biomimetic adhesive pad; and a second connecting structure provided opposite to the first connecting structure and connecting the bracket and a second side of the gecko biomimetic adhesive pad. The first connecting structure is retractable. The first connecting structure and the second connecting structure are configured to collaboratively provide a loading force in a first direction to the gecko biomimetic adhesive pad.

Yet another aspect of the present disclosure provides a robot including the robot grasping jaw, which includes a grasping device, the grasping device includes: a bracket; a gecko biomimetic adhesive pad having a first surface with a directional dry adhesion structure; a first connecting structure connecting the bracket and a first side of the gecko biomimetic adhesive pad; and a second connecting structure provided opposite to the first connecting structure and connecting the bracket and a second side of the gecko biomimetic adhesive pad. The first connecting structure is retractable. The first connecting structure and the second connecting structure are configured to collaboratively provide a loading force in a first direction to the gecko biomimetic adhesive pad.

Details of one or more embodiments of the present disclosure are set forth in the accompanying drawings and description below. Other features, objects, and advantages of the disclosure will become apparent from the description, the drawings, and the claims.

BRIEF DESCRIPTION OF THE DRAWINGS

Following describes specific implementations of the present disclosure in detail with reference to accompanying drawings, which will make the technical solutions and other beneficial effects of the present disclosure obvious.

DESCRIPTION OF EMBODIMENTS

The following description of exemplary embodiments refers to the accompanying drawings. Reference throughout the specification to "one embodiment" or "an embodiment"

means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
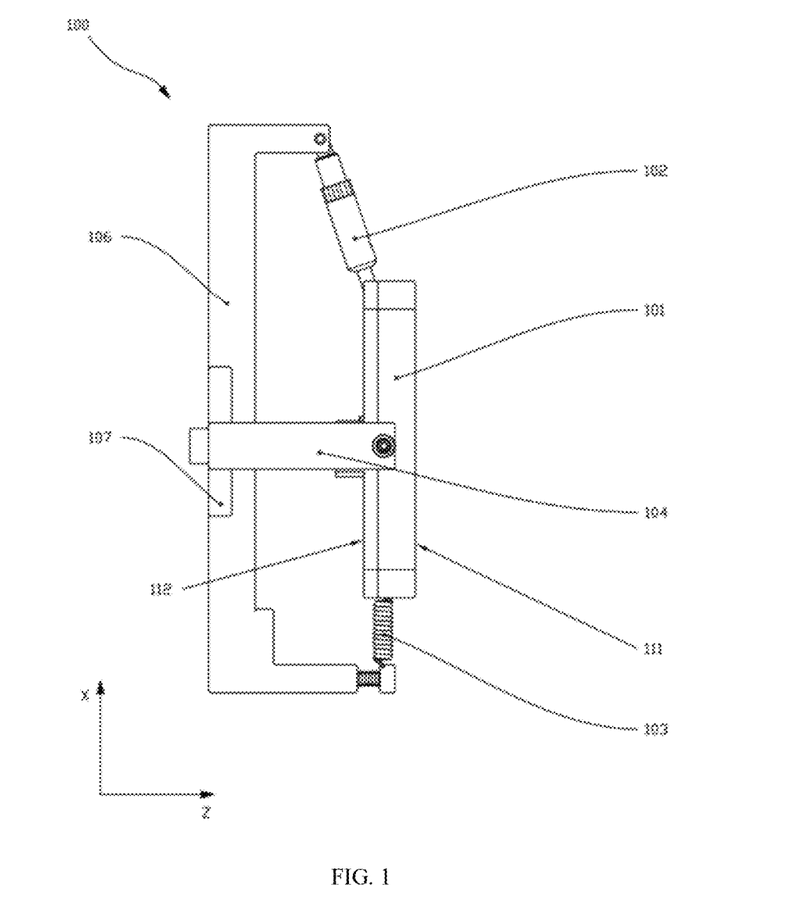
FIG. 1 is a side view of a grasping device according to an embodiment of the present disclosure.
Figure 2:
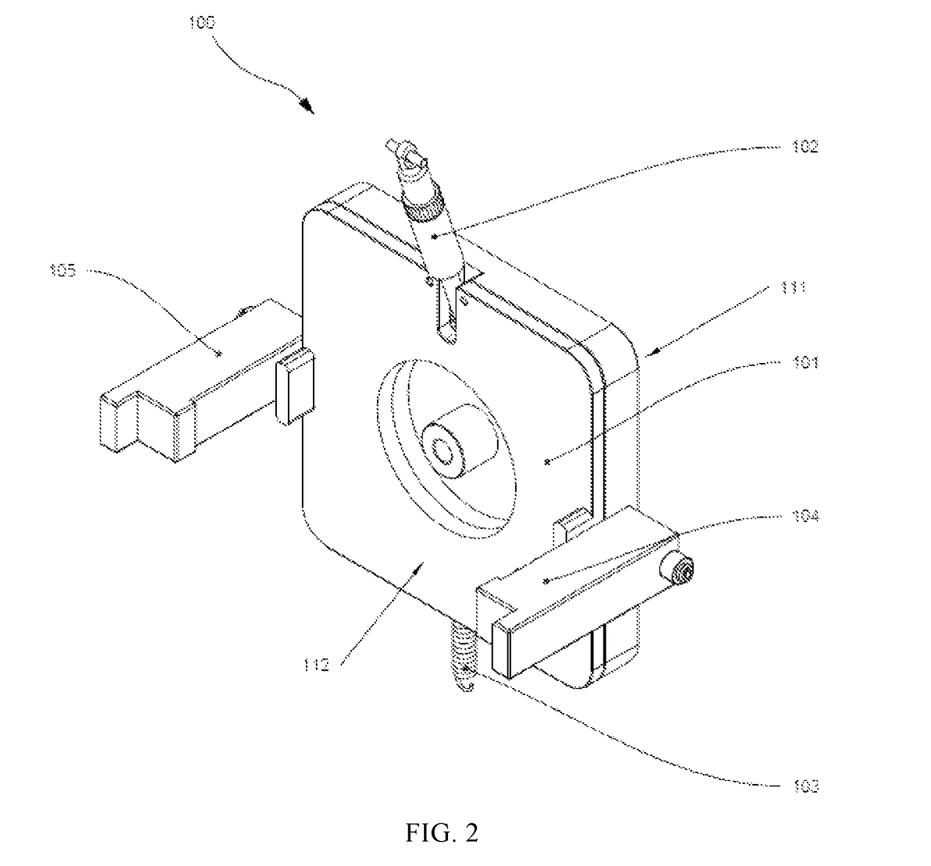
FIG. 2 is a perspective view of a grasping device (without a bracket) according to an embodiment of the present disclosure.
Figure 3:
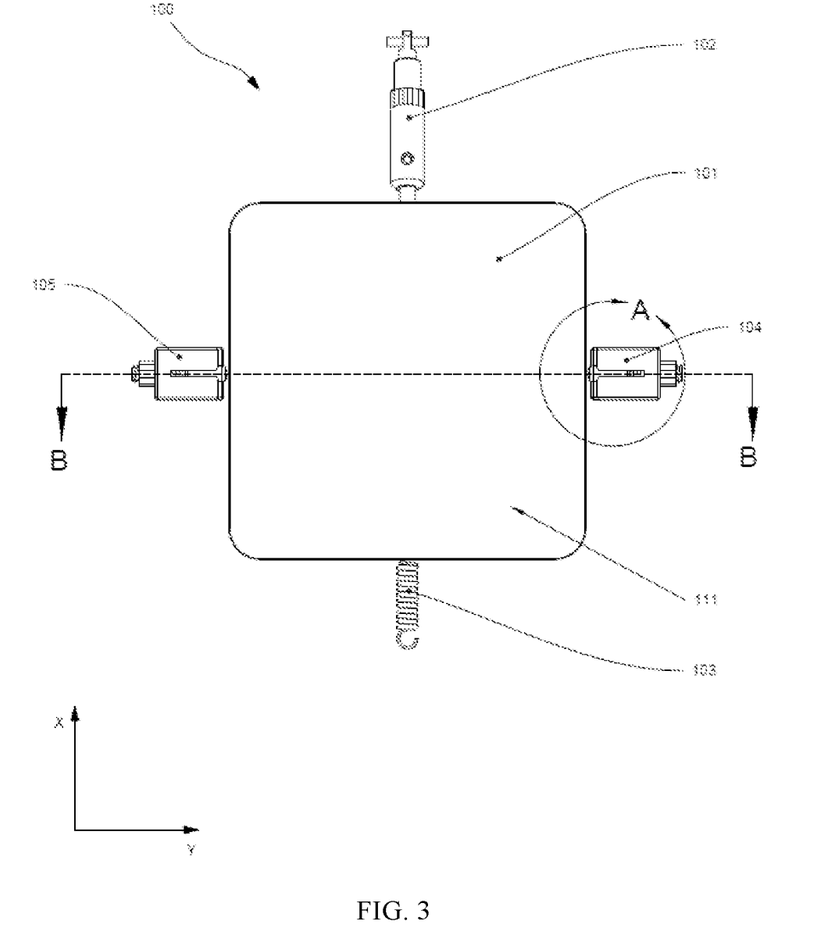
FIG. 3 is a view taken from the bottom of the grasping device in FIG. 2.

Referring to FIGS. 1-3, a grasping device 100 according to an embodiment of the present disclosure will be described. FIG. 1 is a side view of a grasping device according to an embodiment of the present disclosure, FIG. 2 is a perspective view of the grasping device according to the embodiment of the present disclosure, and FIG. 3 is a view taken from the bottom of the grasping device in FIG. 2. In order to show various components easily and clearly, a bracket shown in FIG. 1 is omitted from the grasping device in FIGS. 2-3.

As shown in FIGS. 1-3, there is provided a grasping device 100 that can be attached to, or detached from, an article to be grasped to effect operations such as grasping, transportation and release. The grasping device 100 includes a bracket 106, a gecko biomimetic adhesive pad 101 having a first surface 111 with a directional dry adhesion structure, a first connecting structure 102 connecting the bracket 106 and a first side of the gecko biomimetic adhesive pad 101 (e.g., an upper side in the direction X in FIG. 1), and a second connecting structure 103 provided opposite to the first connecting structure 102 and connecting the bracket 106 and a second side of the gecko biomimetic adhesive pad 101 (e.g., a lower side in the direction X in FIG. 1). The first connecting structure 102 is retractable. The first connecting structure 102 and the second connecting structure 103 are configured to collaboratively provide the gecko biomimetic adhesive pad 101 with a loading force in a first direction (X direction) that can be used to activate the directional dry adhesion structure of the gecko biomimetic adhesive pad 101.

In the gecko biomimetic adhesive pad 101, the first surface 111 may have a predetermined area of releasable adhesive material. For example, as a releasable adhesive material, a directional dry adhesion structure with a plurality of micro-wedges (hereinafter also referred to as micro-wedge structure) may be used, and adhesion and release of an article to be grasped may be achieved by controlling the micro-wedge structure. Thus, a micro-wedge structure will be described as an example. For example, the adhesive material of the micro-wedge structure may be made of a rubber material having a low surface energy (e.g., a silicone material such as PDMS silicone). In normal conditions, the micro-wedge structure is straight so that in the default state, a contact surface between the micro-wedge structure and a surface of the article to be grasped includes only tips of the micro-wedge structure. Because of the small contact surface area between the micro-wedge structure and the surface of the article, the first surface 111 does not adhere to the surface of the article. In the grasping process, the micro-wedge structure of the gecko biomimetic adhesive pad 101 is bent by a preloading operation, which significantly increases the contact area between the micro-wedge structure and the surface of the article, so that the adhesive material is activated and can be adhered to the surface of the article.

Furthermore, a more detailed description of the gecko biomimetic adhesive pad 101 and micro-wedge structure loading principles can be found in the applicant's Chinese patent application CN110769988A titled "OPPOSED, CONTROLLABLE GECKO ADHESIVE GRIPPER SYSTEM WITH SCALABLE MANUFACTURABILITY" and Chinese patent CN110730707B titled "ROBOT WITH SYNTHETIC FIBER GLUE AND GRIPPER".

Thus, by configuring the first connecting structure 102 and the second connecting structure 103 to collaboratively provide a loading force in the first direction (X direction) to the gecko biomimetic adhesive pad 101, a balanced load in the first direction (X direction) can be achieved for the gecko biomimetic adhesive pad 101. Furthermore, by configuring the first connecting structure 102 to be retractable, twisting in the gecko biomimetic adhesive pad 101 can be avoided.

In particular, in some embodiments, the first connecting structure 102 is rotatably connected with the bracket 106, and the second connecting structure 103 is an elastic structure. With this configuration, when the gecko biomimetic adhesive pad 101 moves up and down in a third direction (Z direction) as required, the first connecting structure 102 can be correspondingly moved, so that the gecko biomimetic adhesive pad 101 can realize a small movement in the third direction (Z direction) and a small swing in the first direction (X direction), thereby allowing the gecko biomimetic adhesive pad 101 to be conveniently attached to the surface of the article to be grasped. In some embodiments, the second connecting structure 103 is, for example, an elastomer or a spring, or may also be a membrane structure, the specific material of which may vary depending on the desired performance characteristics.

Further, the grasping device 100 further includes a third connecting structure 104 and a fourth connecting structure 105 connected to the bracket 106 and respectively provided on a third side and a fourth side of the gecko biomimetic adhesive pad 101. The third side is opposed to the fourth side. For example, the third connecting structure 104 is provided on the third side of the gecko biomimetic adhesive pad 101 (for example, the right side in the direction Y in FIG. 3), and the fourth connecting structure 105 is provided on the fourth side of the gecko biomimetic adhesive pad 101 (for example, the left side in the direction Y in FIG. 3).

Further, the third connecting structure 104 and the fourth connecting structure 105 are configured to be adjustable to contact the third side and the fourth side of the gecko biomimetic adhesive pad 101 to provide a loading force in the second direction (Y direction) to the gecko biomimetic adhesive pad. The second direction (Y direction) is perpendicular to the first direction (X direction).

Furthermore, the third connecting structure 104 and the fourth connecting structure 105 may be configured to provide a thrust loading force in the second direction to the gecko biomimetic adhesive pad 101, as described below. Alternatively, the third connecting structure 104 and the fourth connecting structure 105 may be configured to provide a tension loading force in the second direction to the gecko biomimetic adhesive pad 101. For example, the third connecting structure 104 and the fourth connecting structure 105 may be connected to the gecko biomimetic adhesive pad 101 in the second direction (Y direction) and pull the gecko biomimetic adhesive pad 101 as desired to provide the tension loading force in the second direction.

By configuring the third connecting structure 104 and the fourth connecting structure 105 to provide a loading force in the second direction (Y direction) to the gecko biomimetic adhesive pad 101, a balanced load in the second direction (Y direction) can be achieved for the gecko biomimetic adhesive pad 101, and the entire structure of the grasping device 100 can be more compact. Further, by configuring the third connecting structure 104 and the fourth connecting structure 105 to be adjustable to contact with the third side and the fourth side of the gecko biomimetic adhesive pad 101, the third connecting structure 104 and the fourth connecting structure 105 can be adjusted with respect to the gecko biomimetic adhesive pad 101 as desired, and one or both of the third connecting structure 104 and the fourth connecting structure 105 can abut against the gecko biomimetic adhesive pad 101 when a thrust loading force in the second direction (Y direction) is desired and separate from the gecko biomimetic adhesive pad 101 when the gecko biomimetic adhesive pad 101 needs to move up and down in the third direction (Z direction) without causing interference. For example, when the grasping device 100 is used for grasping an article and the grasped article only needs to be lifted upwards, the third connecting structure 104 and the fourth connecting structure 105 do not need to provide a loading force in the second direction (Y direction) to the gecko biomimetic adhesive pad 101. At this time, the third connecting structure 104 and the fourth connecting structure 105 can be adjusted so that they do not contact the gecko biomimetic adhesive pad 101. If it is desired to move the grasped article in a plane perpendicular to the lifting direction (for example, in the second direction), the third connecting structure 104 and the fourth connecting structure 105 are required to provide a loading force in the second direction (Y direction) to the gecko biomimetic adhesive pad 101, thus the third connecting structure 104 and the fourth connecting structure 105 can be adjusted to contact the gecko biomimetic adhesive pad 101.

Further, the third connecting structure 104 and the fourth connecting structure 105 can simultaneously abut against the gecko biomimetic adhesive pad 101, and thus apply a thrust loading force on opposite sides of the gecko biomimetic adhesive pad 101 in the second direction (Y direction) as required, thereby generating a shear force in the second direction (Y direction) and ensuring instantaneity and accuracy of direction of the shear force applied in the second direction (Y direction).

Although in the above example, the gecko biomimetic adhesive pad 101 is illustrated as an example, it should be appreciated that the grasping device 100 may also include other structures provided on the gecko biomimetic adhesive pad 101, such as a gasket portion, a flexible layer, a structural frame, an adapting structure, and the like, to form a glue assembly (GA). Similarly, the glue assembly can achieve the above-mentioned technical effect by providing a surface composed of a releasable adhesive material on one side. In addition, the first connecting structure 102, the second connecting structure 103, the third connecting structure 104, and the fourth connecting structure 105 may be connected to other structures or layers of the glue assembly, so long as the loading force can be transmitted to the gecko biomimetic adhesive pad 101 in the first direction (X direction) or the second direction (Y direction).

Figure 4:
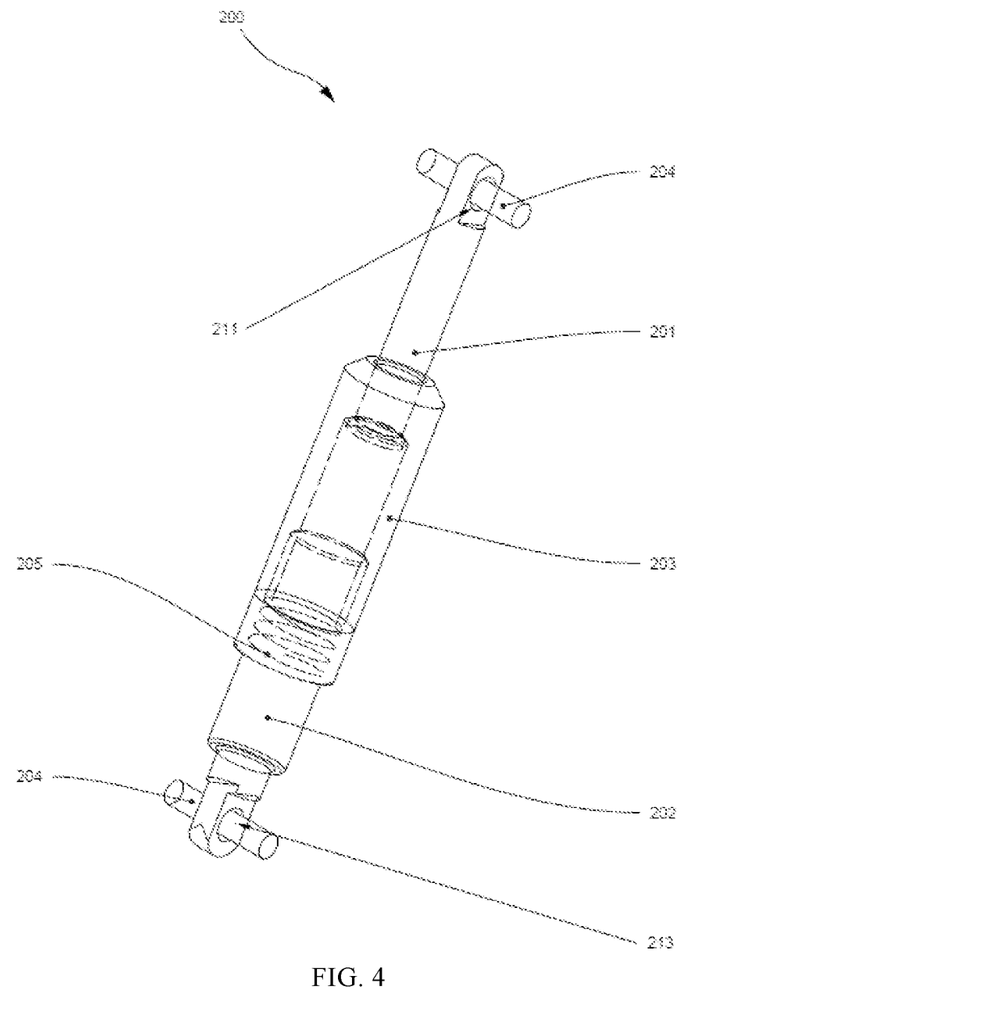
FIG. 4 is a perspective view of a first connecting structure according to an embodiment of the present disclosure.

Next, a first connecting structure 200 according to an embodiment of the present disclosure will be described with reference to FIGS. 4 to 5. FIG. 4 is a perspective view of a first connecting structure 200 according to an embodiment of the present disclosure, and FIG. 5 is a cross-sectional view of the first connecting structure 200 in FIG. 4.

Figure 5:
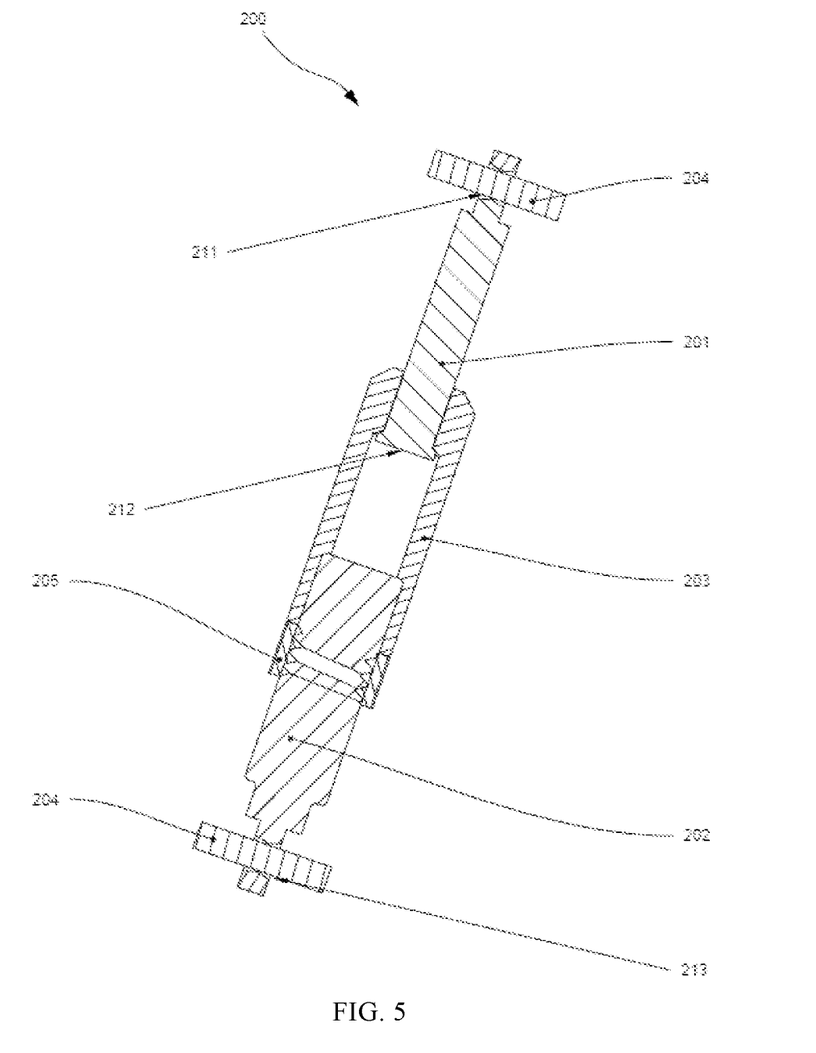
FIG. 5 is a cross-sectional view of the first connecting structure of FIG. 4.

As shown in FIGS. 4-5, a first connecting structure 200 according to an embodiment of the present disclosure includes: a first rod 201, a second rod 202 with threads, and a sleeve with threads 203 configured to sleeve over the first rod 201 and the second rod 202, and be slidable with respect to the first rod 201 to adjust a retracting range of the first connecting structure 200. The second rod 202 is connected with the sleeve 203 by a threaded fit, and the second rod 202 is configured to limit a sliding range of the first rod 201 within the sleeve 203.

Further, in some embodiments, a first hole 211 is provided at one end of the first rod 201. A stopper 212 is provided at the other end of the first rod 201 to restrict sliding of the sleeve 203. A second hole 213 is provided at one end of the second rod 202. The first connecting structure 200 further includes two pivots 204 inserted into the first hole 211 of the first rod 201 and the second hole 213 of the second rod 202, respectively, and connected to the bracket 106 and the gecko biomimetic adhesive pad 101 as described above. The first connecting structure 200 is connected to the bracket 106 and the gecko biomimetic adhesive pad 101 by a pivot 204 so that the first connecting structure 200 is rotatable relative to the bracket 106 and the gecko biomimetic adhesive pad 101, respectively.

Furthermore, in some embodiments, the first connecting structure 200 further includes a first retaining nut 205 sleeved over the second rod 202 to lock the second rod 202 with respect to the sleeve 203.

Compared with a traditional tendon-type gecko material activation device, the first connecting structure 200 in this embodiment uses a retractable rod-type structure, making it easier to manufacture and assemble in bulk, while also facilitating size expansion of similar structures.

Figure 6:
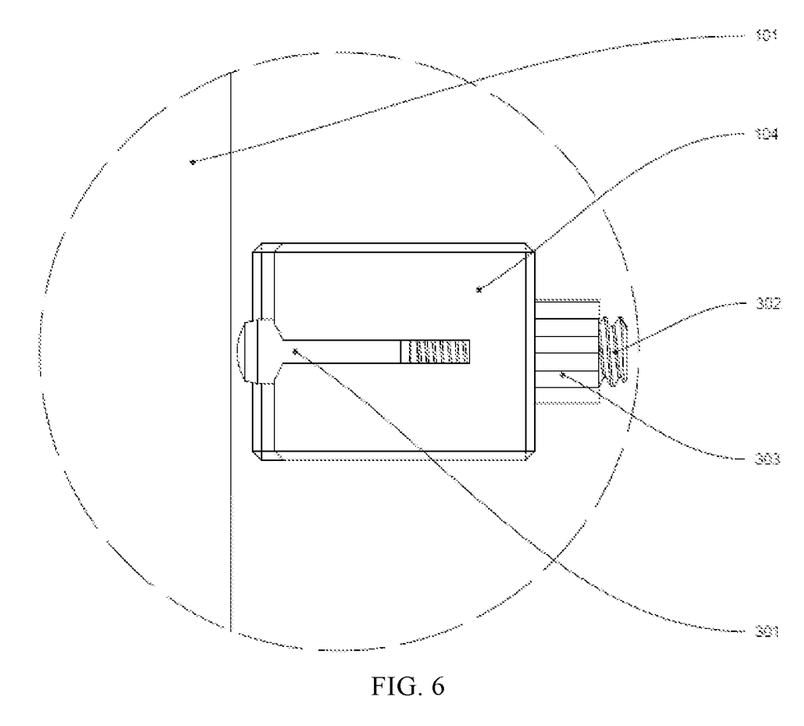
FIG. 6 is a partially enlarged schematic view of the part marked A in FIG. 3 according to an embodiment of the present disclosure.
Figure 7:
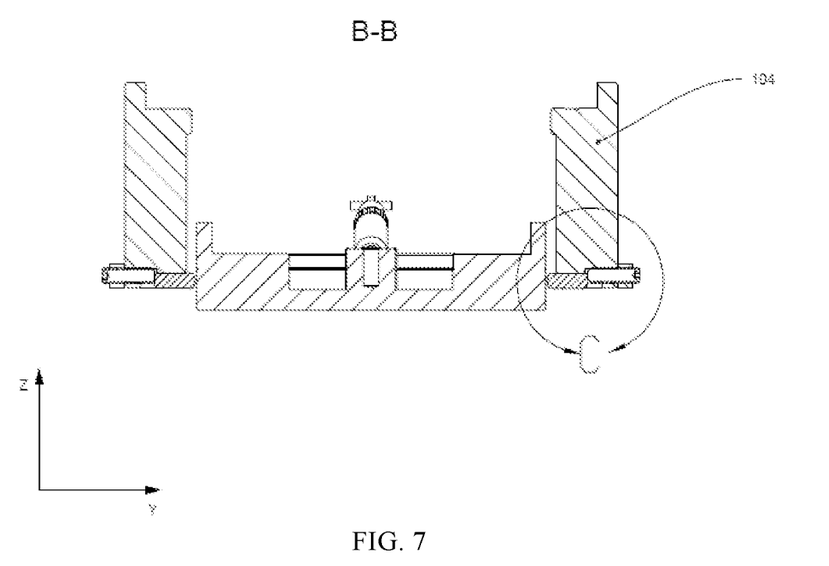
FIG. 7 is a cross-sectional view taken along the line B-B in FIG. 3.
Figure 8:
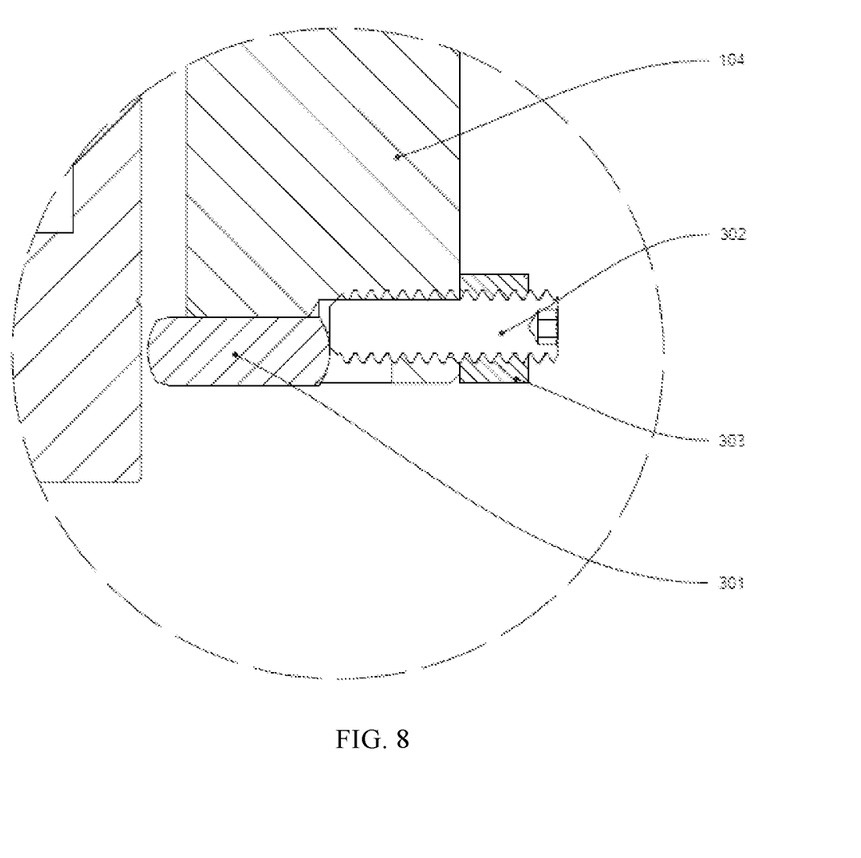
FIG. 8 is a partially enlarged schematic view of the part marked C in FIG. 7.

Next, a third connecting structure according to an embodiment of the present disclosure will be described with reference to FIGS. 3 and 6-8. FIG. 6 is partially enlarged schematic view of the part marked A in FIG. 3 according to an embodiment of the present disclosure, FIG. 7 is a cross-sectional view taken along the line B-B in FIG. 3, and FIG. 8 is a partially enlarged schematic view of the part marked C in FIG. 7.

Figure 9:
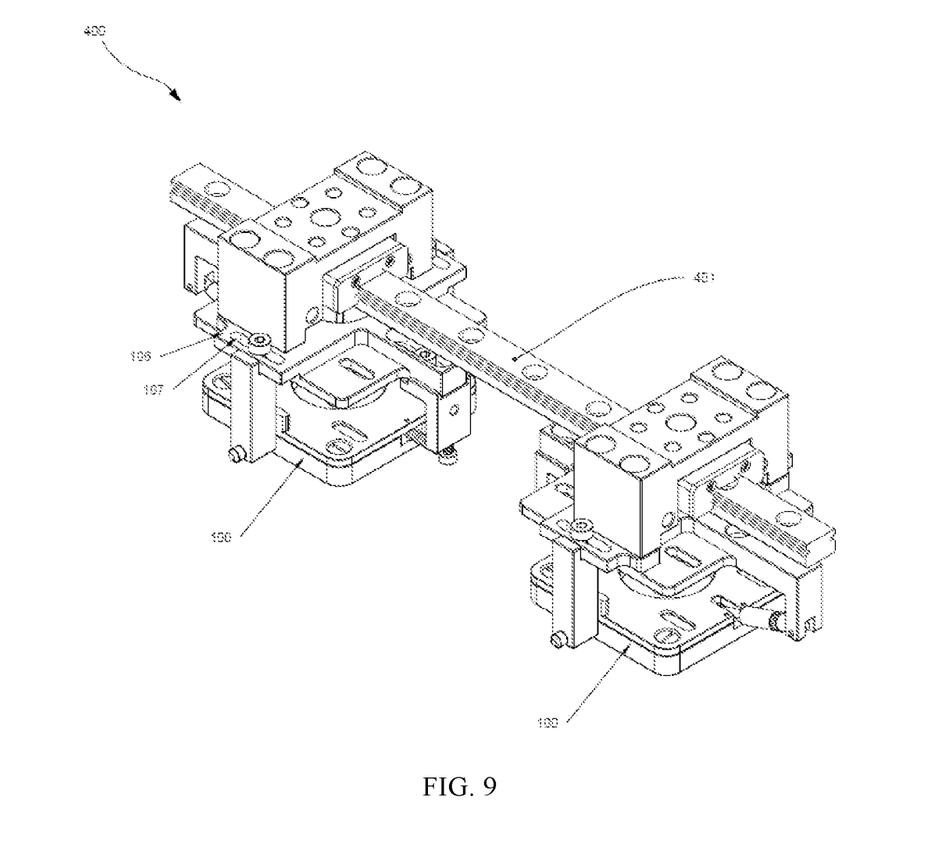
FIG. 9 is a perspective view of a grasping assembly according to an embodiment of the present disclosure.

As shown in FIGS. 3 and 6-8, according to an embodiment of the present disclosure, the third connecting structure 104 is provided on the third side of the gecko biomimetic adhesive pad 101, and the fourth connecting structure 105 is provided on the fourth side of the gecko biomimetic adhesive pad 101. Further, in some embodiments, the third connecting structure 104 and the fourth connecting structure 105 are configured to be adjustable in position on the bracket 106 in the first direction (X direction). For example, slots 107 (as shown in FIGS. 1 and 9) may be provided in the bracket 106, so that the third connecting structure 104 and the fourth connecting structure 105 can adjust their positions along the slots 107. In particular, as shown in FIGS. 1 and 9, the third connecting structure 104 or the fourth connecting structure 105 may be fixed to the slot 107 in the bracket 106 by a nut at one end, for example. When it is desired to adjust the position of the third connecting structure 104 or the fourth connecting structure 105, the nut may be released and the third connecting structure 104 or the fourth connecting structure 105 may slide along the slot 107, and the nut can be re-tightened in place to lock the position.

It should be noted that in the description herein, specific examples of the third connecting structure are described, but the third connecting structure and the fourth connecting structure may have the same or similar structures. Further, the number of each of the third connecting structure and the fourth connecting structure is not limited to one, and a plurality of the third connecting structure or the fourth connecting structure may be provided on the corresponding side of the gecko biomimetic adhesive pad 101 according to the shape of the gecko biomimetic adhesive pad 101. Further, the third connecting structure and the fourth connecting structure may be symmetrically or asymmetrically arranged on both sides of the gecko biomimetic adhesive pad 101.

Further, in some embodiments, the third connecting structure 104 includes: a point contact 301 and an adjusting member 302 configured to move the point contact 301 to make point contact with a corresponding side of the gecko biomimetic adhesive pad 101. In addition, the third connecting structure 104 may further include a second retaining nut 303 for retaining a distance between the point contact 301 and the gecko biomimetic adhesive pad 101. Alternatively, the point contact 301 includes a ball pin.

Thus, the third connecting structure 104 (similarly, the fourth connecting structure 105) may be made of a rigid material such as metal, so as to greatly reduce its elongation under load. Further, since the third connecting structure 104 can be separated from the gecko biomimetic adhesive pad 101, the third connecting structure 104 is used only when the gecko biomimetic adhesive pad 101 requires a lateral force. When no lateral force is required, the third connecting structure 104 may be brought into point contact with the gecko biomimetic adhesive pad 101, or even further separated from the gecko biomimetic adhesive pad 101, thereby eliminating the buckling effect. Further, the spherical point contact 301 can ensure that the thrust applied to the gecko biomimetic adhesive pad 101 is perpendicular to the contacted surface, i.e., in the second direction (Y direction). Alternatively, the position of the third connecting structure 104 relative to the gecko biomimetic adhesive pad 101 in the third direction (Z direction) may be adjusted, so that the thrust can be applied to the gecko biomimetic adhesive pad 101 at different locations in the third direction (Z direction) as desired. In this way, the thrust does not generate additional force components in other directions, which would otherwise distort or cause the gecko biomimetic adhesive pad 101 to lift or rotate undesirably.

Figure 10:
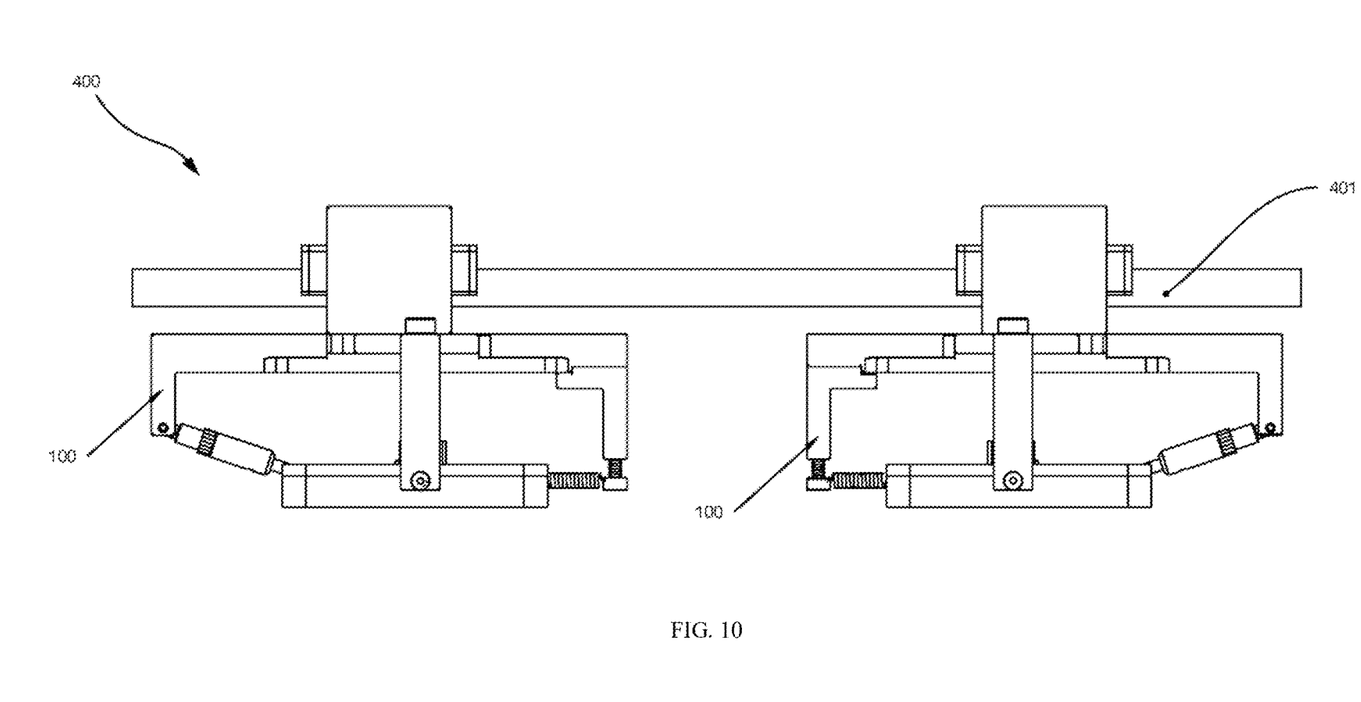
FIG. 10 is a side view of a grasping assembly according to an embodiment of the present disclosure.

Referring now to FIGS. 9-10, a grasping assembly according to an embodiment of the present disclosure will be described. FIG. 9 is a perspective view of a grasping assembly according to an embodiment of the present disclosure, and FIG. 10 is a side view of the grasping assembly according to an embodiment of the present disclosure.

The grasping assembly 400 may include the grasping device 100 described in any of the above embodiments. As shown in FIGS. 9-10, the grasping assembly 400 may include two grasping device 100, each of which may include: a bracket; a gecko biomimetic adhesive pad having a first surface with a directional dry adhesion structure; a first connecting structure connecting the bracket and a first side of the gecko biomimetic adhesive pad; and a second connecting structure provided opposite to the first connecting structure and connecting the bracket and a second side of the gecko biomimetic adhesive pad. The first connecting structure is retractable. The first connecting structure and the second connecting structure are configured to collaboratively provide a loading force in a first direction to the gecko biomimetic adhesive pad.

In addition, the grasping device 100 may further include a third connecting structure and a fourth connecting structure. The third connecting structure and the fourth connecting structure are configured to be connected to the bracket and provided on a third side and a fourth side of the gecko biomimetic adhesive pad. The third side is opposed to the fourth side. The third connecting structure and the fourth connecting structure are configured to be adjustable to contact the third side and the fourth side of the gecko biomimetic adhesive pad to provide a loading force in a second direction to the gecko biomimetic adhesive pad, and the second direction is perpendicular to the first direction.

In the above-described grasping assembly 400, by configuring the first connecting structure and the second connecting structure to collaboratively provide a loading force in a first direction to the gecko biomimetic adhesive pad, a balanced load in the first direction can be achieved for the gecko biomimetic adhesive pad. Furthermore, by configuring the first connecting structure to be retractable, twisting in the gecko biomimetic adhesive pad can be avoided. Further, by configuring the third connecting structure and the fourth connecting structure to provide a loading force in the second direction to the gecko biomimetic adhesive pad, a balanced load in the second direction can be achieved for the gecko biomimetic adhesive pad, and the entire structure can be more compact.

Further, as shown in FIGS. 9-10, in the grasping assembly 400 according to an embodiment of the present disclosure, two grasping devices 100 are connected in series by a rail 401. Thus, by sliding the two grasping devices 100 along the rail 400, the positions of the two grasping devices 100 with respect to each other can be changed, and the shapes of the articles to be grasped can be adaptively fitted.

Further, a direction of the directional dry adhesion structure of one of the two or more grasping devices 100 can be different from a direction of the directional dry adhesion structure of another one of the two or more grasping devices 100. As a result, the adhesion of the grasping device 100 to the article can be enhanced. For example, in the case of two grasping devices 100, the directions of their directional dry adhesion structures are opposite (both pointing to the center, for example).

Figure 11:
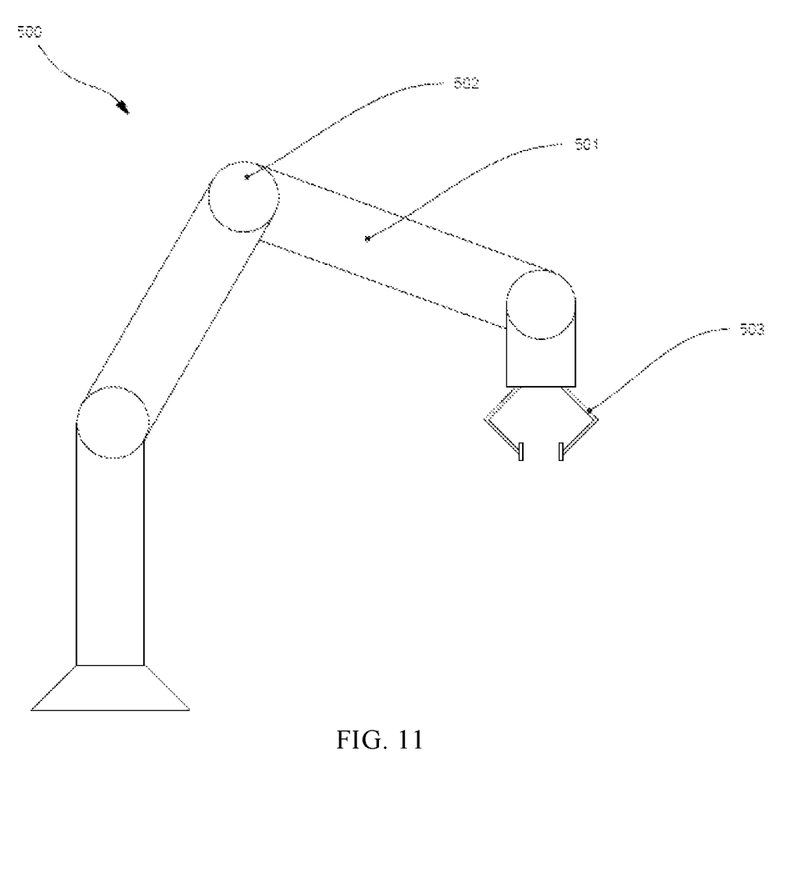
FIG. 11 is a schematic structural view of a robot according to an embodiment of the present disclosure.

Referring now to FIGS. 11, a robot grasping jaw and a robot according to an embodiment of the present disclosure will be described. FIG. 11 is a schematic structural view of a robot according to an embodiment of the present disclosure. As shown, the robot 500 may include a plurality of connecting arms 501, and every two connecting arms 501 are pivotally connected by a respective joint 502. The robot 500 further includes a robot grasping jaw 503. One end of the robot grasping jaw 503 is connected to a corresponding connecting arm 501, and the other end of the robot grasping jaw 503 is provided with a grasping device 100 or a grasping assembly 400 as described above. Thus, the robot 500 can be used to grasp or grip articles. It will be appreciated by those skilled in the art that the structure shown in FIG. 11 is merely an exemplary embodiment of the robot 500. In other embodiments, robot 500 may include more or fewer components, such as additional connecting arms and end effectors. Some components (e.g., two or more connecting arms) may be combined, and components of a different or additional type than those depicted may be employed. For example, the robot may also include an I/O device, a network access device, a communication bus, a processor, a memory, an actuator, and a sensor to enable control of the system. For example, the robot 500 may include a processor and a memory that stores instructions that, when executed by the processor, enable the processor to control the system. The memory may also store instructions that, when executed by the processor, enable the processor to activate or deactivate the robot grasping jaw 503 to grip or release articles to be grasped.

In description of the present disclosure, it should be understood that orientational or positional relationships represented by directional terms, such as "central", "longitudinal", "lateral", "length", "width", "thickness", "up", "down", "front", "rear", "left", "right", "vertical", "horizontal", "top", "bottom", "inside", "outside", "clockwise", "anticlockwise", "axial", "radial", "circumferential" etc., are orientational or positional relationships based on the drawings, and are merely for the convenience of describing the present disclosure and simplifying the description, rather than indicating or implying that the device or element is intended to have a particular orientation, or is constructed and operated in a particular orientation, and therefore, should not be interpreted as a limitation of the present disclosure.

In addition, terms such as "first" and "second" are used herein for purposes of description, and should not be interpreted as indication or implication of relative importance, or implied indication of a number of the technical features. Therefore, features limited by terms such as "first" and "second" can explicitly or impliedly include one or more than one of these features. In description of the present disclosure, "a plurality of" means more than two, unless otherwise specifically defined.

In the present disclosure, unless otherwise clearly specified and limited, the terms "installed", "connected", "connecting", "fixed" and other terms should be understood in a broad sense, for example, it can be a fixed connection or a detachable connection. Or integrated; it can be mechanically connected or electrically connected; it can be directly connected or indirectly connected through an intermediary, it can be the internal communication of two components or the interaction relationship between two components, unless otherwise specified The limit. For those skilled in the art, the specific meanings of the above terms in the present disclosure can be understood according to specific circumstances.

Technical features of the foregoing embodiments may be combined. For brevity of the description, not all possible combinations of the technical features in the foregoing embodiments are described. However, these combinations shall fall within the scope recorded in this specification as long as the combinations have no conflict.

The foregoing embodiments are merely some embodiments of the present disclosure, and descriptions thereof are relatively specific and detailed. However, it should not be understood as a limitation to the patent scope of the present disclosure. It should be noted that, a person of ordinary skill in the art may further make some variations and improvements without departing from the concept of the present disclosure, and the variations and improvements belong to the protection scope of the present disclosure. Therefore, the protection scope of the present disclosure shall be subject to the protection scope of the appended claims.

What is claimed is:

1. A grasping device, comprising:
    a bracket;
    a gecko biomimetic adhesive pad having a first surface with a directional dry adhesion structure;
    a first connecting structure connecting the bracket rotatably and a first side of the gecko biomimetic adhesive pad, wherein the first connecting structure is a retractable rod-type structure, and a retracting range of the first connecting structure is adjustable; and
    a second connecting structure provided opposite to the first connecting structure and connecting the bracket and a second side of the gecko biomimetic adhesive pad, wherein the second connecting structure is an elastic structure,
    wherein the first connecting structure and the second connecting structure are configured to collaboratively provide a loading force in a first direction to the gecko biomimetic adhesive pad.

2. The grasping device according to claim 1, further comprising a third connecting structure and a fourth connecting structure configured to be connected to the bracket and respectively provided on opposing third and fourth sides of the gecko biomimetic adhesive pad,
    wherein the third connecting structure and the fourth connecting structure are configured to be adjustable to contact the third side and the fourth side of the gecko biomimetic adhesive pad to provide a loading force in a second direction to the gecko biomimetic adhesive pad, the second direction being perpendicular to the first direction.

3. The grasping device according to claim 2, wherein the third connecting structure and the fourth connecting structure are configured to provide a thrust loading force in the second direction to the gecko biomimetic adhesive pad.

4. The grasping device according to claim 2, wherein the third connecting structure and the fourth connecting structure are configured to be adjustable in position on the bracket in the first direction.

5. The grasping device according to claim 2, wherein at least one of the third connecting structure and the fourth connecting structure comprises:
    a point contact; and
    an adjusting member configured to move the point contact to make point contact with a corresponding side of the gecko biomimetic adhesive pad.

6. The grasping device according to claim 5, wherein the point contact comprises a ball pin.

7. The grasping device according to claim 5, wherein the directional dry adhesion structure comprises a plurality of micro-wedges.

8. The grasping device according to claim 5, wherein the first connecting structure comprises:
    a first rod;
    a second rod with threads; and
    a sleeve with threads configured to sleeve over the first rod and the second rod, and be slidable with respect to the first rod to adjust the retracting range of the first connecting structure, wherein the second rod is connected with the sleeve by a threaded fit, and the second rod is configured to limit a sliding range of the first rod within the sleeve.

9. The grasping device according to claim 8, wherein a first hole is provided at one end of the first rod, and a stopper is provided at the other end of the first rod to restrict sliding of the sleeve,
    wherein a second hole is provided at one end of the second rod, and
    wherein the first connecting structure further comprises two pivots inserted into the first hole of the first rod and the second hole of the second rod, respectively, and connected to the bracket and the gecko biomimetic adhesive pad.

10. The grasping device according to claim 8, wherein the first connecting structure further comprises a first retaining nut sleeved over the second rod to lock the second rod with respect to the sleeve.

11. A robot grasping jaw comprising a grasping device, the grasping device comprising:
    a bracket;
    a gecko biomimetic adhesive pad having a first surface with a directional dry adhesion structure;
    a first connecting structure connecting the bracket rotatably and a first side of the gecko biomimetic adhesive pad, wherein the first connecting structure is a retractable rod-type structure, and a retracting range of the first connecting structure is adjustable; and a second connecting structure provided opposite to the first connecting structure and connecting the bracket and a second side of the gecko biomimetic adhesive pad, wherein the second connecting structure is an elastic structure, wherein the first connecting structure and the second connecting structure are configured to collaboratively provide a loading force in a first direction to the gecko biomimetic adhesive pad.

12. The robot grasping jaw according to claim 11, wherein the grasping device further comprises a third connecting structure and a fourth connecting structure configured to be connected to the bracket and respectively provided on opposing third and fourth sides of the gecko biomimetic adhesive pad, wherein the third connecting structure and the fourth connecting structure are configured to be adjustable to contact the third side and the fourth side of the gecko biomimetic adhesive pad to provide a loading force in a second direction to the gecko biomimetic adhesive pad, the second direction being perpendicular to the first direction.

13. The robot grasping jaw according to claim 12, wherein the third connecting structure and the fourth connecting structure are configured to provide a thrust loading force in the second direction to the gecko biomimetic adhesive pad.

14. A robot comprising a robot grasping jaw, which comprises a grasping device, the grasping device comprising:

a bracket;

a gecko biomimetic adhesive pad having a first surface with a directional dry adhesion structure;

a first connecting structure connecting the bracket rotatably and a first side of the gecko biomimetic adhesive pad, wherein the first connecting structure is a retractable rod-type structure, and a retracting range of the first connecting structure is adjustable; and a second connecting structure provided opposite to the first connecting structure and connecting the bracket and a second side of the gecko biomimetic adhesive pad, wherein the second connecting structure is an elastic structure, wherein the first connecting structure and the second connecting structure are configured to collaboratively provide a loading force in a first direction to the gecko biomimetic adhesive pad.

15. The robot according to claim 14, wherein the grasping device further comprises a third connecting structure and a fourth connecting structure configured to be connected to the bracket and respectively provided on opposing third and fourth sides of the gecko biomimetic adhesive pad, wherein the third connecting structure and the fourth connecting structure are configured to be adjustable to contact the third side and the fourth side of the gecko biomimetic adhesive pad to provide a loading force in a second direction to the gecko biomimetic adhesive pad, the second direction being perpendicular to the first direction.

16. The robot according to claim 15, wherein the third connecting structure and the fourth connecting structure are configured to provide a thrust loading force in the second direction to the gecko biomimetic adhesive pad.

* * * * *